Aug. 20, 1935.  C. LE R. LEWIS  2,012,196
CREAM AND MILK PURIFIER
Filed Aug. 3, 1934   2 Sheets-Sheet 1

Inventor
Claude LeRoy Lewis
Geo. P. Kimmel
Attorney

Aug. 20, 1935.   C. LE R. LEWIS   2,012,196
CREAM AND MILK PURIFIER
Filed Aug. 3, 1934   2 Sheets-Sheet 2
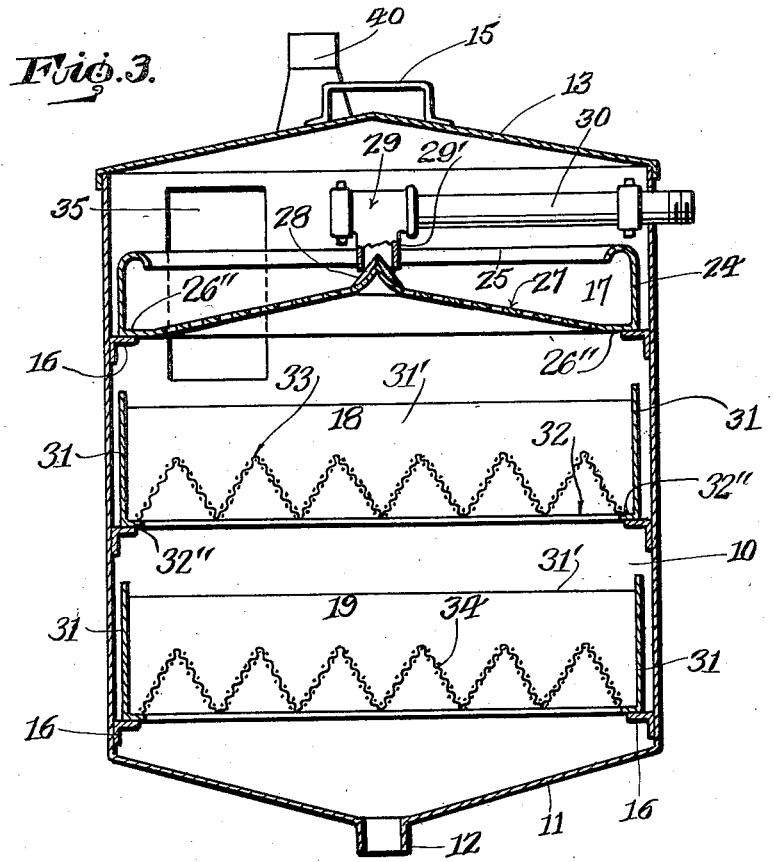
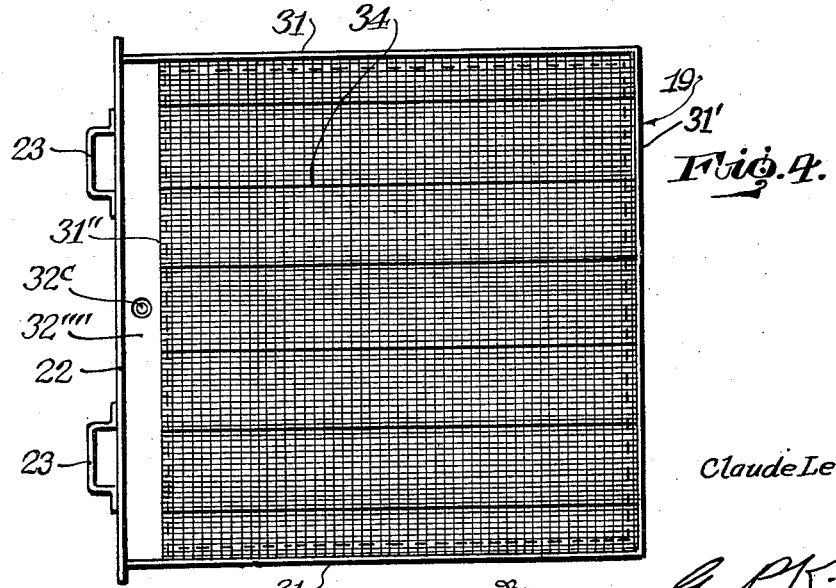
Inventor
Claude LeRoy Lewis
By Geo. S. Kimmel
Attorney Patented Aug. 20, 1935

2,012,196

UNITED STATES PATENT OFFICE 2,012,196

CREAM AND MILK PURIFIER

Claude Le Roy Lewis, Omaha, Nebr., assignor of one-half to George W. Street, Omaha, Nebr.

Application August 3, 1934, Serial No. 738,384

4 Claims. (Cl. 210—149)

My present invention has to do with the purifying of cream and milk from pasteurizers, and its primary object is the provision of a machine which will effectively handle the highly heated cream and milk and purify the same both by deodorization and straining, in a partial vacuum rendering the operation both speedy and effective.

My invention has for a further object the provision of a novel and effective construction and arrangement of parts in an organization permitting easy maintenance of cleanliness and sanitation, and presenting an attractive appearance as well as certain other advantages which may be better understood and more thoroughly appreciated from the detailed description and by reference to the accompanying drawings.

In the drawings, illustrating my invention and forming a part of this specification, Figure 1 is a central vertical transverse sectional view through my improved apparatus.

Figure 3 is a vertical sectional view taken centrally through the apparatus at right angles to Figure 1, and, Figure 4 is a detail top plan view of one of the mesh strainers.

Figure 1:
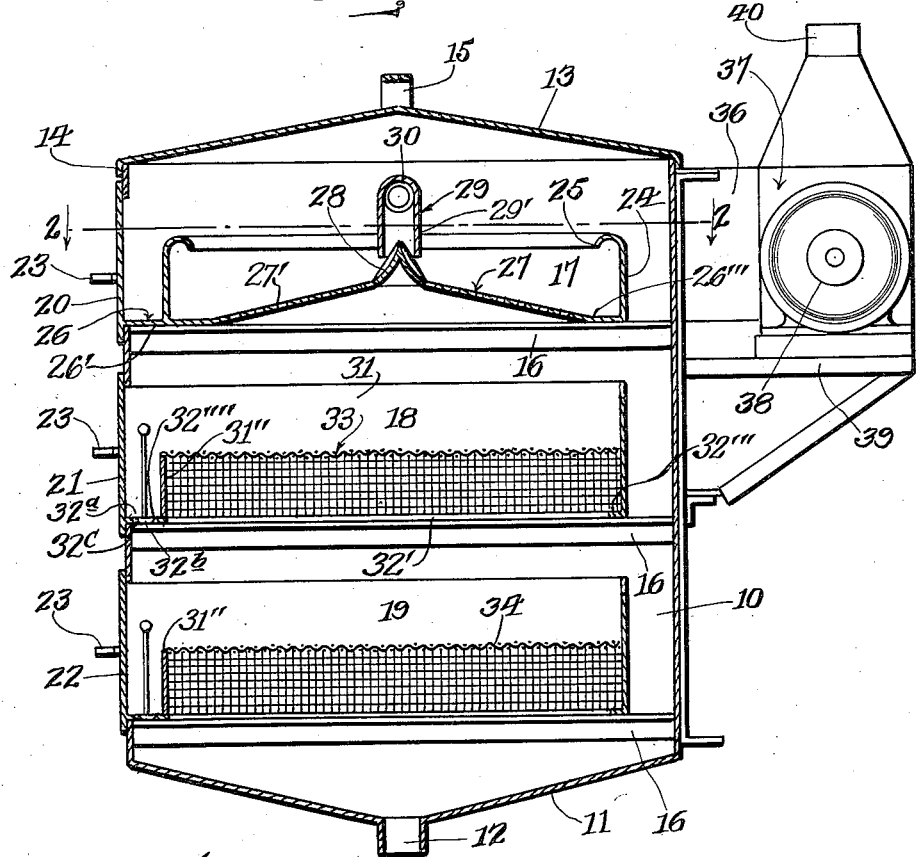
Figure 2:
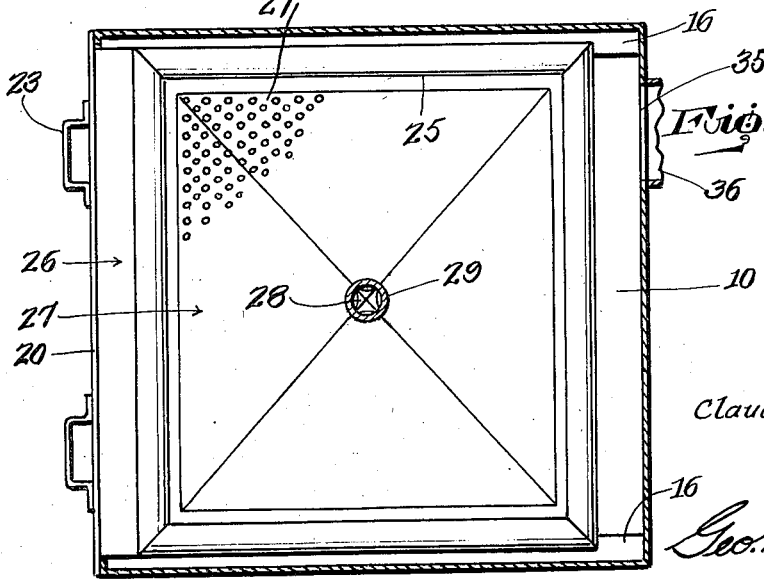
Figure 2 is a horizontal section taken therethrough substantially on line 2—2 of Figure 1.

Referring now to the above figures, I propose a cabinet-like casing 10, of rectangular form, whose bottom wall 11 inclines from all sides toward a central outlet spout 12, and whose open top is normally closed by a cover plate 13 having a flanged surrounding edge 14 to telescope the upper edge of the casing 10, and a central upstanding handle 15. The casing has slidably mounted therein a series of superposed spaced strainer structures of drawer like form which will be hereinafter specifically described. Preferably the number of strainer structures will be three and are generally designated at 17, 18 and 19. The said structures will be referred to as drawers. Each drawer includes a bottom to be referred to. The bottom of each drawer constitutes what may be termed a carrier.

The front wall of casing 10 has a vertical series of horizontally elongated rectangular drawer openings and is provided along the inner surfaces of its side walls with rigid angle bars 16 alined with the bases of the drawer openings and forming slide rails.

The several drawers 17, 18 and 19 are respectively the top, intermediate and bottom drawers, having respectively front walls, 20, 21 and 22, each slightly larger than the front wall openings of the cabinet so that the latter are thus substantially closed, when the drawers are in position within the cabinet, by virtue of flatwise contact of the outer portions of said front walls of the drawers against the front wall of the cabinet. Each drawer has its front wall provided with handles 23 so that the drawers may be conveniently removed and replaced.

The top drawer 17 not only includes the front wall 20, but also an upstanding endless wall 24 formed at its top with an inwardly curved downturned lip 25 for arresting and directing foam back into said drawer. The wall 24 is of less height than wall 20. The drawer 17 further includes a bottom 26 having secured to the outer edge thereof, the front wall 20. The bottom 26 is of frame like contour and formed with a front, a rear and a pair of side marginal portions 26', 26" and 26'''. The portion 26' is of greater width than the said other portions. The portions 26" and 26''' are of the same width. Formed integral with the inner sides of said marginal portions is an upstanding frusto-pyramidal screen element 27 having a series of integral sides 27' which are perforated throughout. Each side 27' extends inwardly and upwardly from a marginal portion of bottom 26. The sides 27' at their upper ends merge into a vertically extending peripherally edged or ribbed conic deflector 28 positioned axially with respect to wall 24 and having the major portion of its length disposed below the free edge of lip 25. The peripheral edges or ribs of deflector 28 are spaced from each other. The wall 24 is integral with the inner and side edges of bottom 26 and also integral with the upper face of marginal portion 26' at the lengthwise center of the latter.

Positioned axially of the casing 10 is a cream and milk supply nozzle 29 having a vertically arranged tubular discharge part 29'. The upper portion of the deflector 28 extends into the lower end of part 29'. The peripheral edges or ribs of deflector 28 bear against the inner corner of the lower edge of part 29'. Supported by one side of and extending into casing 10 is a cream and milk supply pipe 30 which is connected to and opens into one end of nozzle 29. The pipe 30 is arranged above drawer 17.

Thus the cream and milk, delivered in the first instance into the top drawer 17, is deflected, or distributed in streams, down the inclined perforated sections 27 of the bottom of the drawer and any tendency to run over the endless wall 24 is defeated by the lip 25.

The cream and milk flow down through the perforations of the base sections 27 of top drawer 17 into the intermediate drawer 18, any heavy particles or solids being retained in the top drawer and constantly washed from the distributing cone and sections 17 so that the perforations are kept clear for the constant flow of cream and milk.

The intermediate drawer 18, not only includes the front wall 21, but also a pair of vertical side walls 31, a vertical rear wall 31' and a vertical partition 31''. The latter is of less height than the wall 31. The side walls are of the same height, of less height than the front wall 21, but of greater height than the wall 31'. The drawer 18 also includes a bottom 32 formed with an enlarged opening 32' to provide said bottom 32 with side marginal portions 32'', a rear marginal portion 32''' and a front marginal portion 32''''. The portion 32''' is of less width than the portions 32'' and the portion 32'''' is of materially greater width than the portion 32'''. The outer edge of portion 32'''' is secured to the front wall 21. The partition 31'' is integral with and flush with the inner edge of portion 32''''. The side walls 31 are secured to front wall 21 and to the marginal portions 32'' of the bottom 32. The rear wall 31' is secured to the marginal portion 32''' of bottom 32. The side and rear walls 31 and 31' are flush with the side and rear edges of bottom 32. The height of rear wall 31' is such so as to take care of any overflow and prevent leaking through the front of the cabinet. Anchored to the marginal portions 32'' and abutting the rear wall 31', as well as seating upon the marginal portion 32''' is a reticulated or foraminous screen element 33 of corrugated form. The material from which the element 33 is constructed is preferably screen wire of approximately thirty mesh, deeply corrugated as plainly seen in Figure 3 so that the apices of the corrugations form relatively sharp angles and the walls are steeply inclined. The marginal portion 32'''' of bottom 32 in connection with the partition 31'', side walls 31 and front wall 21 provides a drain trough 32a formed with an outlet 32c closed by a removal plug 32b. The troughs provide means for trapping any splash or overflow of the filtered liquid when the latter impacts a screen element 33 or 34. The trapped filtered fluid may be drained from the troughs on the removal of the plugs 32b.

The bottom drawer 19 is constructed in the same manner as the intermediate drawer, except that the wire of the screen element 34 of the bottom drawer is preferably of from fifty to sixty mesh so as to retain the fine sediment which the intermediate drawer fails to catch. The cream and milk flowing downwardly from the bottom drawer is directed by the cabinet base 11 through the outlet spout 12.

Each of the drawers supporting the screens may thus be easily and quickly removed and drained by removing drain plugs 32b, and also easily and quickly cleaned and replaced, while in their effective position they close the cabinet-like casing to such an extent that the cream and milk as it passes therethrough may be subjected to the effective action of a partial vacuum for cooling the same and removing odors, during the full length of its travel through the cabinet. For this purpose steam rising from the cream and milk and carrying with it most of the undesirable odors, is exhausted through an outlet 35 opening through the upper portion of the rear cabinet wall into a short flue 36 communicating with the intake of a fan casing 37 which, with the motor 38 actuating the fan in said casing, is mounted on a rear bracket 39. The outlet opening 35 is of a height to have its upper portion arranged above drawer 17 and its lower portion positioned between the bottom of drawer 17 and top of drawer 18. The fan casing 37, as best seen in Figure 1, has an upper outlet 40.

Thus the cream and milk entering the casing through the inlet pipe 30 substantially at pasteurizing temperature will be subjected to straining in its passages therethrough and undesirable odors effectively removed, since the partial vacuum increases evaporation. In removing the steam with its undesirable odors, heat is of course removed and the cream and milk thus cooled to a considerable extent, though the purifying, both by the removal of odors and by straining, is the result at which my invention is chiefly aimed.

It is obvious that, in removing the top drawer 17, the inlet pipe 30 can be turned so that the wall 24 will pass beneath the fitting 29, and it is equally obvious that in other respects the construction, arrangement and operation of the parts fulfill the objects first above stated and promote efficiency and sanitation.

What I claim is:

1. A cream and milk purifier comprising an upright cabinet-like casing having a fluid outlet at its base, a fluid inlet, means within the casing and disposed axially of the upper portion of the latter, a series of superposed spaced drawers slidable into and out of the casing through its front wall into the upper of which the cream and milk flows from said inlet, each drawer having a portion of its bottom in the form of a screen element for separating impurities from the cream and milk in its passage successively through the drawers to said outlet, the screen element of the upper drawer carrying an upstanding peripherally edged deflector extending into said fluid inlet means from the bottom of the latter, one wall of the casing having an upper outlet, and means for constantly exhausting steam and other gases from the casing through the outlet in said wall.

2. A cream and milk purifier comprising an upright cabinet-like casing having a cream and milk outlet at its base and an open top, a cover normally closing the open top, a vertical series of superposed spaced drawers slidable into and out of the casing through front openings in the latter and normally closing said openings when within the casing, each of said drawers having a portion of its bottom in the form of a strainer, and a wall surrounding the strainer, said surrounding walls being fixed to the upper faces of said bottoms adjacent said strainers, a cream and milk inlet pipe extending through the upper portion of the casing wall, a nozzle connected to the inner end of said pipe and having a depending discharge part disposed axially with respect to the strainer of the top drawer, and said top drawer having the top of its wall provided with an inwardly curved and downwardly extending lip to prevent overflow of the fluid and to turn back foam.

3. In a cream and milk purifier of that type including a casing having an outlet at its lower part and a plurality of lower superposed spaced removable strainer structures, the combination of a fluid inlet means arranged within the upper portion of said casing, a frusto-pyramidal screen element formed at its upper end with a conic deflector extending into said inlet means, said element having flat imperforated laterally exextending marginal portions at its lower end, an upstanding endless wall integral with said marginal portions, and extending above and surrounding in spaced relation that part of said element above said marginal portions, and a carrier for said element and wall slidably mounted in the casing and arranged in superposed spaced relation with respect to the upper one of the superposed strainer structures.

4. In a cream and milk purifier of that type including a casing having an outlet at its lower part and a plurality of lower superposed spaced removable strainer structures, the combination of a fluid inlet means arranged within the upper portion of said casing, a frusto-pyramidal screen element formed at its upper end with a conic deflector extending into said inlet means, an upstanding endless wall surrounding and extending above said element in spaced relation to the latter, and a carrier for said element and wall slidably mounted in the casing and arranged in superposed spaced relation with respect to the upper one of the superposed strainer structures, and said wall being formed at its top with an inwardly curved downwardly extending endless lip, said lip having its depending portion being spaced from the body of the said wall.

CLAUDE LE ROY LEWIS.